United States Patent
Zondler et al.

(10) Patent No.: US 11,949,132 B2
(45) Date of Patent: Apr. 2, 2024

(54) FUEL CELL SYSTEM WITH AIR-COOLED COMPRESSOR/TURBINE UNIT AND METHOD

(71) Applicant: Robert Bosch GmbH, Stuttgart (DE)

(72) Inventors: Johannes Zondler, Stuttgart (DE); Tobias Reinhard Ott, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 17/624,774

(22) PCT Filed: Jun. 8, 2020

(86) PCT No.: PCT/EP2020/065817
§ 371 (c)(1),
(2) Date: Jan. 4, 2022

(87) PCT Pub. No.: WO2021/004715
PCT Pub. Date: Jan. 14, 2021

(65) Prior Publication Data
US 2022/0246953 A1    Aug. 4, 2022

(30) Foreign Application Priority Data
Jul. 5, 2019 (DE) .................... 10 2019 209 958.0

(51) Int. Cl.
*H01M 8/04014* (2016.01)
*H01M 8/04111* (2016.01)
(Continued)

(52) U.S. Cl.
CPC .... *H01M 8/04014* (2013.01); *H01M 8/04111* (2013.01); *H01M 8/04358* (2013.01);
(Continued)

(58) Field of Classification Search
CPC ......... H01M 8/04014; H01M 8/04111; H01M 8/04358; H01M 8/04373; H01M 8/04768; H01M 8/04776
See application file for complete search history.

(56) References Cited

U.S. PATENT DOCUMENTS

2015/0114607 A1* 4/2015 Moscatelli .......... F28D 15/0266
165/104.26

FOREIGN PATENT DOCUMENTS

DE         10006344 A1     8/2001
DE    10-2017-211943    *   1/2019
(Continued)

OTHER PUBLICATIONS

English translation of DE Publication 10-2017-211943, Jan. 2019.*
Translation of International Search Report or Application No. PCT/EP2020/065817 dated Aug. 13, 2020 (2 pages).

*Primary Examiner* — Brittany L Raymond
(74) *Attorney, Agent, or Firm* — Michael Best & Friedrich LLP

(57) ABSTRACT

The invention relates to a fuel cell system (1) comprising an air compressor (5) which is used to compress an air mass flow (4) that is supplied to at least one fuel cell (3), and further comprising a cooling air path (19), via which a cooling air mass flow (7) is branched off from the compressed air mass flow (6). The cooling of the air compressor (5) in the fuel cell system (1) is further improved by an on-demand control (20) of the compressed cooling air mass flow (6).

7 Claims, 1 Drawing Sheet

(51) Int. Cl.
*H01M 8/0432* (2016.01)
*H01M 8/04746* (2016.01)

(52) U.S. Cl.
CPC ... *H01M 8/04373* (2013.01); *H01M 8/04768* (2013.01); *H01M 8/04776* (2013.01); *H01M 2250/20* (2013.01)

(56) References Cited

FOREIGN PATENT DOCUMENTS

| | | |
|---|---|---|
| DE | 102017211943 A1 | 1/2019 |
| DE | 102017212815 A1 | 1/2019 |
| DE | 102017217075 A1 | 3/2019 |
| WO | 2019145065 A1 | 8/2019 |

* cited by examiner

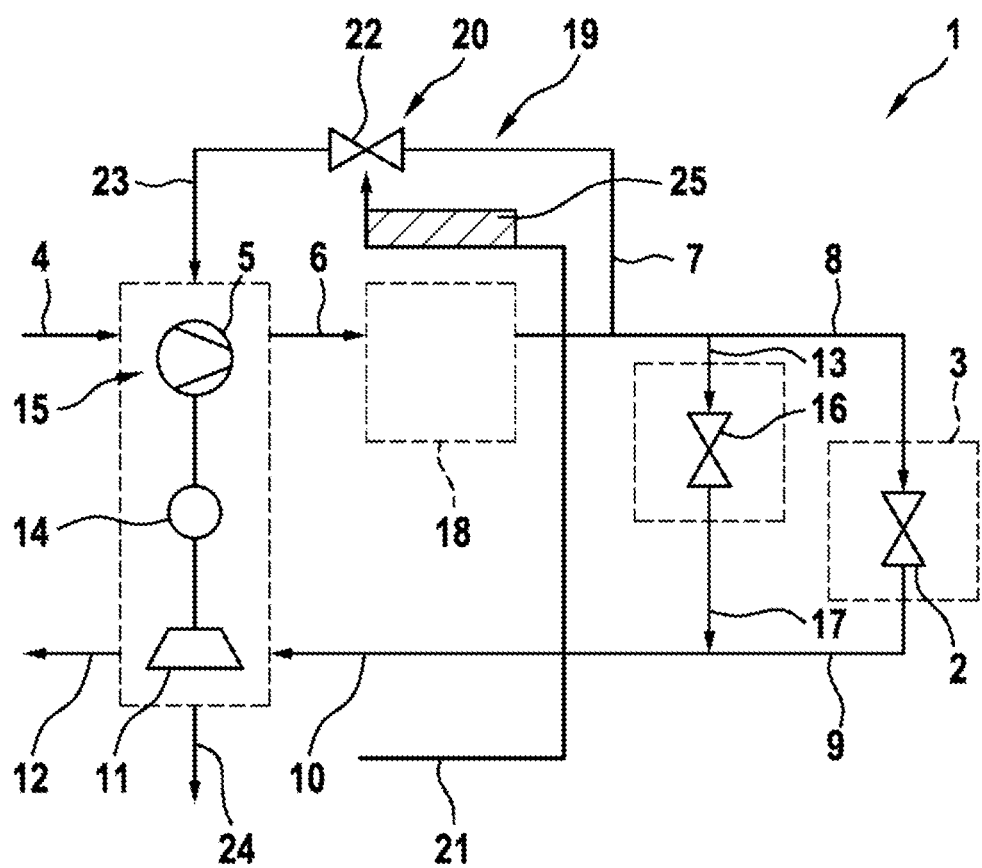

FUEL CELL SYSTEM WITH AIR-COOLED COMPRESSOR/TURBINE UNIT AND METHOD

BACKGROUND OF THE INVENTION

The invention relates to a fuel cell system having an air compressor which serves to compress an air mass flow that is fed to at least one fuel cell, and having a cooling air path, via which a cooling air mass flow is branched off from the compressed air mass flow. The invention also relates to a method for operating an air compressor in a fuel cell system of this kind.

German Laid-Open Application DE 10 2017 212 815 A1 discloses a fuel cell system having a fuel cell, an air feed line for feeding an oxidizing agent into the fuel cell and an exhaust line for discharging the oxidizing agent from the fuel cell, wherein the fuel cell system has a turbomachine having an impeller, which is embodied as a compressor, which is arranged in the air feed line, wherein, in order to optimize the cooling of the turbomachine, it is not compressed air which has already been heated that is used by the impeller; instead, uncompressed air which has been cooled is sucked in from the opposite direction.

SUMMARY OF THE INVENTION

It is the object of the invention to further improve the cooling of an air compressor in a fuel cell system.

The object is achieved, in a fuel cell system having an air compressor which serves to compress an air mass flow that is fed to at least one fuel cell, and having a cooling air path, via which a cooling air mass flow is branched off from the compressed air mass flow, by a demand-dependent controller for the compressed cooling air mass flow. The demand-dependent controller is embodied as a control circuit with a desired value, an actual value, a manipulated variable and a controlled variable. In conventional fuel cell systems, the mass flow which is established in the cooling air path depends to a large extent on the pressure prevailing downstream of the air compressor. The result is that the highest mass flow is established near a surge limit, in particular at high pressures at the compressor outlet, and the lowest mass flow is established near a choke limit, in particular at low pressures at the compressor outlet. The cooling mass flow required for cooling the air compressor during operation of the fuel cell system depends on various factors, such as a rotational speed, a compression ratio and a power of an electric machine which is operated with the fuel cell system. By means of the controller claimed, the cooling air mass flow can be adjusted to the cooling requirement of the air compressor. As a result, the cooling air mass flow can be kept to a minimum. The mass flow of the cooling system represents a loss in the main mass flow of the fuel cell system since the cooling air mass flow is no longer available in a stack of the fuel cell. Since the cooling air mass flow via the air compressor is provided for internal cooling, energy is necessary to produce it. This energy has a negative effect on an overall efficiency of the electric machine. The claimed control of the cooling air thus has an efficiency-increasing effect.

A preferred exemplary embodiment of the fuel cell system is characterized in that the controller comprises a measuring point at a cooling air outlet, by means of which a temperature of the cooling air at the cooling air outlet is detected and used as controlled variable. In this way, convenient control of the compressed cooling air mass flow in the cooling air path is made possible in a simple manner.

Another preferred exemplary embodiment of the fuel cell system is characterized in that an experimentally determined limit value of at least one outlet temperature of an exhaust gas mass flow of the fuel cell is used as the desired value of the controller. This is an outlet temperature at one outlet. In the case of multiple outlets, it is a matter of multiple outlet temperatures.

Another preferred exemplary embodiment of the fuel cell system is characterized in that the manipulated variable of the controller used in the cooling air path is a fluidic resistor whose flow resistance changes as a function of the temperature of the cooling air at the cooling air outlet in order to meter the compressed cooling air mass flow in a demand-dependent manner. The fluidic resistor is, for example, a restrictor. In the claimed controller, a conventional fixed restrictor is replaced by a restrictor with an adjustable restrictor cross section, for example.

Another preferred exemplary embodiment of the fuel cell system is characterized in that the fluidic resistor is embodied in such a way that a minimum cooling air mass flow always flows through the cooling air path. This ensures that the cooling air at the measuring point at the cooling air outlet always reaches a cooling air temperature representative of an internal temperature of the electric machine equipped with the fuel cell system.

Another preferred exemplary embodiment of the fuel cell system is characterized in that the cooling air path has arranged in it a bimetallic matrix, which is used to form the manipulated variable of the controller and comprises bimetals which are arranged adjacent to one another and have different coefficients of thermal expansion. Thus, the cooling air mass flow can be metered in a demand-dependent manner. The bimetals with the different coefficients of thermal expansion allow precise control of the cooling air mass flow. This provides the advantage that compressed air is not branched off unnecessarily between the air compressor and the fuel cell.

Another preferred exemplary embodiment of the fuel cell system is characterized in that the air compressor is embodied as an electric turbocompressor. The electric turbocompressor is electrically driven, for example by an electric motor. The turbocompressor comprises at least one compressor impeller, which is used to compress the air in the air feed to the fuel cell. The turbocompressor advantageously further comprises at least one turbine rotor of an exhaust gas turbine which is associated with the air outlet or exhaust gas outlet of the fuel cell. A turbocompressor of this kind is also referred to as a turbomachine.

The invention furthermore relates to a method for operating an air compressor in a fuel cell system as described above. With the claimed method, the provision of cooling air in the cooling air path can be adapted to the actual cooling air requirement.

The invention furthermore relates to a computer program product comprising a computer program, which has software means for carrying out a method as described above, when the computer program is executed on a computer. The invention may also relate to a control unit of a fuel cell system with such a computer program product.

The invention furthermore relates to a fluidic resistor, in particular a bimetallic matrix, for a fuel cell system as described above. The fluidic resistor, in particular the bimetallic matrix, can be handled separately.

Further advantages, features and details of the invention will be found in the following description, in which various exemplary embodiments are described in detail with reference to the drawing.

BRIEF DESCRIPTION OF THE DRAWING

The single FIGURE appended shows a schematic illustration of a fuel cell system having an air compressor which is cooled by a cooling air mass flow branched off from a compressed air mass flow.

DETAILED DESCRIPTION

A fuel cell system 1 is illustrated schematically in FIG. 1.

Fuel cell systems are known per se, for example from German Laid-Open Application DE 10 2012 224 052 A1. The fuel cell system 1 comprises a fuel cell 3, which is indicated only by a rectangle in dashed lines. The fuel cell 3 comprises at least one stack 2, which is represented by an equivalent valve symbol.

An air mass flow, which is fed to the fuel cell 3 via an air compressor 5, is indicated by an arrow 4. An arrow 6 indicates a compressed air mass flow 6, from which a cooling air mass flow 7 is branched off. The cooling air mass flow 7 is likewise indicated only by an arrow and is part of a cooling air path 19, via which cooling air is fed to the air compressor 5.

The cooling air fed in via the cooling air path 19 serves, for example, to cool air bearings, by means of which a shaft of the air compressor 5 is rotatably mounted. The cooling air mass flow 7 represents a loss in the compressed air mass flow 6 since the branched-off cooling air mass flow 7 is no longer available in the stack 2 of the fuel cell 3.

Since the cooling air mass flow 7 via the air compressor 5 is provided for internal cooling, energy, in particular electrical energy, is necessary to produce it. This energy has a negative effect on the overall efficiency of an electric drive motor of a motor vehicle which is driven by means of the fuel cell system 1.

The remaining air mass flow 6 is fed to the fuel cell 3 via an air feed line 8. The fuel cell 3 is a galvanic cell which converts the chemical reaction energy of a fuel fed in via a fuel feed line (not shown) and an oxidizing agent into electrical energy.

The oxidizing agent is the air which is fed to the fuel cell 3 via the air feed line 8. The fuel can preferably be hydrogen or methane or methanol. Accordingly, water vapor and carbon dioxide are produced as exhaust gas. The exhaust gas is discharged in the form of an exhaust gas mass flow 10 via an exhaust line 9, as indicated by an arrow 10.

The exhaust gas mass flow 10 is discharged via an exhaust gas turbine 11 to an exhaust gas outlet 12, which is indicated by an arrow. The air compressor 5 is arranged in the air feed line 8. The exhaust gas turbine 11 is arranged in the exhaust line 9. The air compressor 5 and the exhaust gas turbine 11 are mechanically connected via a shaft.

The shaft can be driven electrically by an electric motor 14. The exhaust gas turbine 11 serves to assist the electric motor 14 in driving the air compressor 5. The air compressor 5, the exhaust gas turbine 11, the shaft and the electric motor 14 together form a turbocompressor 15, which is also referred to as a turbomachine.

The fuel cell system 1 further comprises a bypass line 13, in which a bypass valve 16 is arranged. Via the bypass line 13 with the bypass valve 16, a bypass air mass flow 17 can be discharged from the air feed line 8 into the exhaust line 9 in order to reduce the pressure, while bypassing the stack 2 of the fuel cell 3. This is advantageous, for example, in order to bring about a pressure reduction in the air mass flow fed to the fuel cell 3 via the air feed line 8.

The fuel cell system 1 further comprises an intercooler 18, which is indicated by a rectangle in dashed lines. The intercooler 18 serves to cool the compressed air mass flow 6 before the cooling air mass flow 7 is branched off via the cooling air path 19.

The fuel cell system 1 is equipped with a controller 20, by means of which the branched-off cooling air mass flow 7 is adjusted to the cooling air requirement of the turbocompressor 15. The branched-off cooling air mass flow 7 can be kept low by adjusting the cooling air mass flow 7 to the requirement of the turbocompressor 15, which is also referred to as a turbomachine, or machine for short. This in turn makes it possible to increase the efficiency of a motor vehicle whose drive motor is driven by means of the fuel cell system 1.

An arrow 21 indicates that the temperature of the cooling air at a cooling air outlet 24 is used as the controlled variable of the controller 20. The cooling air outlet is indicated by an arrow 24. Similarly, the cooling air inlet is indicated by an arrow 23.

The cooling air inlet 23 is assigned a fluidic resistor 22, which is combined with a bimetallic matrix 25, indicated only by a hatched rectangle, to form the controller 20. The bimetallic matrix 25 is used to form the manipulated variable of the controller 20.

For the demand-dependent metering of the cooling air mass flow 7, the bimetallic matrix 25 consists of a plurality of different bimetals arranged adjacent to one another. Each bimetal has a different coefficient of thermal expansion, ensuring that precise control of the cooling air mass flow 7 takes place and air that has been compressed is not branched off unnecessarily from the compressed air mass flow 6 that is provided by the turbocompressor 15.

In order to ensure that the cooling air temperature at the measuring point at the cooling air outlet 4 is always representative of the internal temperature of the machine, there must always be a minimum cooling air mass flow at the cooling air inlet 23. Complete closure of the fluidic resistor 22 must therefore be prevented. This ensures that the machine does not overheat internally without the temperature at the cooling air outlet 24 changing to a relevant extent.

The invention claimed is:

1. A fuel cell system (1) comprising:
a turbomachine (15),
a turbine (11),
an air compressor (5) which is used to compress an air mass flow (4) that is fed to at least one fuel cell (3),
a cooling air path (19), via which a cooling air mass flow (7) is branched off from a compressed air mass flow (6), and
a demand-dependent controller (20) for the cooling air mass flow (7), wherein a temperature of cooling air at a cooling air outlet (24) of the turbomachine (15) is a controlled variable of the controller (20), wherein a fluidic resistor (22) in the cooling air path (19) is a manipulated variable of the controller (20), wherein a flow resistance of the fluidic resistor (22) changes as a function of the temperature of the cooling air at the cooling air outlet (24) of the turbomachine (15) to meter the cooling air mass flow (7) in a demand-dependent manner, wherein the cooling air path (19) has arranged in it a bimetallic matrix (25), which is used to form the manipulated variable of the controller (20) and the bimetallic matrix (25) comprises bimetals which are arranged adjacent to one another and have different coefficients of thermal expansion, and wherein the bimetallic matrix (25) is supplied the cooling air at the cooling air outlet (24) of the turbomachine (15).

2. The fuel cell system as claimed in claim 1, wherein the controller (20) comprises a measuring point at a cooling air outlet (24), by means of which a temperature of the cooling air at the cooling air outlet (24) is detected and used as controlled variable.

3. The fuel cell system as claimed in claim 1, wherein an experimentally determined limit value of at least one outlet temperature of an exhaust gas mass flow (10) of the fuel cell is used as a desired value of the controller (20), wherein the desired value is a setpoint of the controller (20) at an outlet selected from the group consisting of: the cooling air outlet (24) and an exhaust gas outlet (12) of the fuel cell (3).

4. The fuel cell system as claimed in claim 1, wherein the fluidic resistor (22) is embodied in such a way that a minimum cooling air mass flow always flows through the cooling air path (19).

5. The fuel cell system as claimed in claim 1, wherein the air compressor (5) comprises an electric turbocompressor (15).

6. A method of operating an air compressor (5) in a fuel cell system (1), the method comprising;
- compressing, via an air compressor (5) an air mass flow (4) that is fed to at least one fuel cell (3),
- branching off, via a cooling air path (19), a cooling air mass flow (7) from a compressed air mass flow (6), wherein the cooling air path (19) has arranged in it a bimetallic matrix (25) and the bimetallic matrix (25) comprises bimetals which are arranged adjacent to one another and have different coefficients of thermal expansion, and
- metering, via a demand-dependent controller (20), the cooling air mass flow (7) based on a controlled variable and a manipulated variable, wherein the controlled variable of the controller (20) is a temperature of cooling air at a cooling air outlet (24) of a turbomachine (15), wherein the manipulated variable of the controller (20) is a fluidic resistor (22) in the cooling air path (19), wherein a flow resistance of the fluidic resistor (22) changes as a function of the temperature of the cooling air at the cooling air outlet (24) of a turbomachine (15), and wherein the bimetallic matrix (25) forms the manipulated variable of the controller (20) and is supplied the cooling air at the cooling air outlet (24) of the turbomachine (15).

7. A non-transitory, computer-readable medium containing instructions that when executed by a computer cause the computer to control operation of an air compressor (5) in a fuel cell system (1) to
- compress an air mass flow (4) that is fed to at least one fuel cell (3),
- branch off, via a cooling air path (19), a cooling air mass flow (7) from a compressed air mass flow (6), wherein the cooling air path (19) has arranged in it a bimetallic matrix (25) and the bimetallic matrix (25) comprises bimetals which are arranged adjacent to one another and have different coefficients of thermal expansion, and
- meter the cooling air mass flow (7) based on a controlled variable and a manipulated variable, wherein the controlled variable of a demand-dependent controller (20) is a temperature of cooling air at a cooling air outlet (24) of a turbomachine (15), wherein the manipulated variable of the controller (20) is a fluidic resistor (22) in the cooling air path (19), wherein a flow resistance of the fluidic resistor (22) changes as a function of the temperature of the cooling air at the cooling air outlet (24) of a turbomachine (15), and wherein the bimetallic matrix (25) forms the manipulated variable of the controller (20) and is supplied the cooling air at the cooling air outlet (24) of the turbomachine (15).

\* \* \* \* \*